United States Patent [19]
Wischermann

[11] Patent Number: 5,543,858
[45] Date of Patent: Aug. 6, 1996

[54] METHOD OF AND APPARATUS FOR REDUCING NOISE IN A MOTION DETECTOR SIGNAL

[75] Inventor: Gerhard Wischermann, Weiterstadt, Germany

[73] Assignee: U. S. Philips Corporation, New York, N.Y.

[21] Appl. No.: 253,522

[22] Filed: Jun. 3, 1994

[30] Foreign Application Priority Data

Jun. 11, 1993 [DE] Germany ............... 43 19 342.0

[51] Int. Cl.$^6$ ................................................ H04N 5/21
[52] U.S. Cl. ................................ 348/618; 348/701
[58] Field of Search ................................ 348/618, 619, 348/700, 701; H04N 5/21

[56] References Cited

U.S. PATENT DOCUMENTS

| | | | |
|---|---|---|---|
| 4,195,350 | 3/1980 | Moore | 364/724 |
| 4,485,403 | 11/1984 | Illetschko | 348/620 |
| 4,539,594 | 9/1985 | Illetschko | 348/620 |
| 4,652,907 | 3/1987 | Fling | 348/620 |
| 4,661,853 | 4/1987 | Roeder et al. | 348/6 |
| 5,185,664 | 2/1993 | Darby | 348/620 |

FOREIGN PATENT DOCUMENTS

| | | | |
|---|---|---|---|
| 3121597 | 12/1982 | Germany | H04N 5/21 |
| 4137404 | 5/1993 | Germany | H04N 5/21 |
| 4143179 | 7/1993 | Germany | H04N 5/21 |

*Primary Examiner*—Safet Metjahic
*Assistant Examiner*—Jeffrey Murrell
*Attorney, Agent, or Firm*—Bernard Franzblau

[57] ABSTRACT

A method of reducing noise in the signal of a motion detector for recursive filtering of video signals, in which the signal is median-filtered. A part of the amplitude range of this signal located below a threshold value is suppressed and the signal is subsequently used for forming the factor (k) controlling the recursive filter. In the case of stationary images or images of little motion, the factor (k) is set at a maximum value dependent upon interference pulses occurring in the video input signal (V1) and at a minimum value dependent upon interference pulses occurring in the video output signal (V2).

11 Claims, 2 Drawing Sheets

METHOD OF AND APPARATUS FOR REDUCING NOISE IN A MOTION DETECTOR SIGNAL

BACKGROUND OF THE INVENTION

Field of the Invention

This invention relates to a method of reducing noise in the signal of a motion detector for recursive filtering of video signals, in which the signal is median-filtered, a part of the amplitude range of this signal located below a threshold is suppressed and which signal is subsequently used for forming the factor (k) controlling the recursive filter, and further relates to a circuit arrangement for performing the method.

DESCRIPTION OF THE RELATED ART

To reduce noise in video signals, circuits are known which are based on the principle of time-recursive filtering. By feedback of an image-delayed output signal to the input of a recursive filter, the noise component is averaged over several image periods and thus reduced. The degree of noise reduction depends on the value of the feedback picture signal in proportion to the input signal. These known filter circuits reduce equally distributed noise, white noise, film grain noise or band noise of a magnetic recording apparatus very effectively, though only for stationary images.

To avoid a smearing effect due to the recursive filter in moving images or in the case of camera panning, a motion detector is provided in a system, known from DE 31 21 597 C2, corresponding to U.S. Pat. No. 4,485,403, for reducing noise in a television signal, which motion detector controls the value of the feedback video signal in dependence upon motion present in the image. In the known system, a motion signal is obtained by subtraction of the undelayed and the delayed video signal. However, similar to as in the input signal, this motion signal is initially beset with noise which detrimentally influences the motion detector. For example, strong noise may be misinterpreted as motion so that the recursive filter does not achieve the optimal noise reduction. In order that this noise is not used for controlling the recursive filter, equally distributed noise is suppressed by means of a threshold circuit and a low-pass filter. However, this motion detector fails in the case of strong noise and particularly in the case of pulse noise.

To obviate this drawback, DE 41 43 179.0 proposes a method of reducing noise in a signal of a motion detector for video signals, in which the motion signal is passed through a median filter before noise cut-off by a threshold circuit. As a result, pulse noise can be reduced essentially, but cannot be eliminated completely.

SUMMARY OF THE INVENTION

It is therefore, inter alia, an object of the invention to completely eliminate equally distributed noise and pulsatory interference of high amplitudes such as RF glitches, signal dropouts, film scratching noise etc. in the motion signal generated by subtraction of the undelayed and the delayed signal, so that only noise signals rather than signal components representing actual motion are suppressed.

This object is achieved by the method as set forth above, characterized in that, in the case of stationary images or images of little motion, the factor (k) is set at the maximum value in dependence upon interference pulses occurring in the video input signal (V1), and at the minimum value in dependence upon interference pulses occurring in the video output signal (V2).

The method according to the invention has the advantage that the merits of recursive filtering and median filtering are combined, viz. unlimited reduction of equally distributed white noise, complete elimination of pulse interferences of a higher amplitude, an undelayed output signal in which the noise has been eliminated, and a small number of circuit components because only a two-dimensional median filter is required.

These and other aspects of the invention will be apparent from and will be elucidated with reference to the embodiments described hereinafter.

BRIEF DESCRIPTION OF THE DRAWINGS

In the drawings.

Identical components are denoted by the same reference symbols in the figures.

DESCRIPTION OF THE PREFERRED EMBODIMENT

Figure 1:
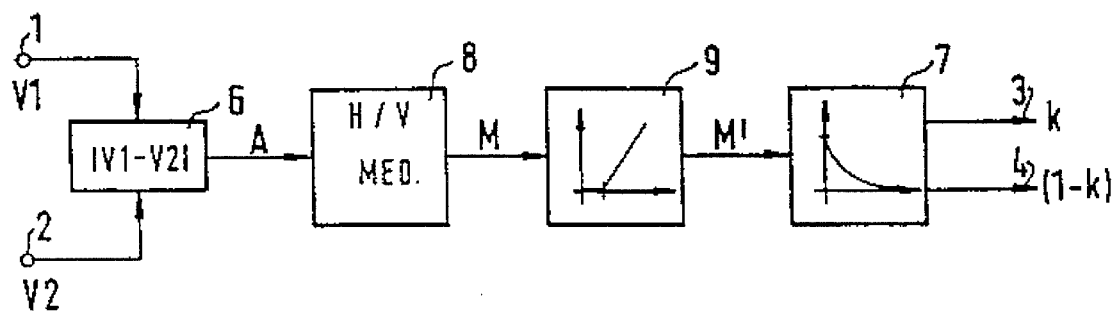
FIG. 1 is a block diagram of an existing motion detector.

FIG. 1 is a block diagram of a motion detector as described in DE 41 43 179. As is known, the underlayer video input signal V1 beset with noise and the video output signal V2 delayed by one frame period of a recursive filter known, for example, from DE 31 21 597 (U.S. Pat. No. 4,485,403) are present at the terminals 1 and 2 of the motion detector. The factors k and (1-k) for the multiplier circuits for determining the degree of averaging of the recursive filter can be derived from the output terminals 3 and 4.

The closer that k approaches the value 1, the stronger the effect of the filter and the larger the time covered by the averaging operation (integration).

In stationary images, a substantially unlimited noise reduction is possible when an arbitrarily long integration is realized. However, in moving images or in the case of camera panning, the integration leads to lack of definition at edges or smearing effects of moving image details so that the integration time is to be reduced when there is motion in the image.

To this end, a motion detector as shown in FIG. 1 is provided. It comprises essentially a subtractor 6 with which the difference between the undelayed and the delayed signal (V1-V2) is formed. Since the influence on noise reduction should be independent of the sign of changing the image contents, the value (signal A) is also formed by the difference in the subtractor 6. Dependent on the magnitude of the changes, a factor k and (1-k), respectively, is generated in the circuit 7 for control of the degree of noise reduction.

Since, in addition to motion, noise also leads to an output signal A of the subtractor 6, which output signal is, however, not to be used for controlling the integration process, a two-dimensional median filter 8, operating as a low-pass filter, and a threshold circuit 9 are arranged between the subtractor 6 and the circuit 7. These components reduce the equally distributed noise and impulsive noise, with the median filter 8 active via H and V suppressing impulsive noise of a higher amplitude and the threshold circuit 9 compensating the average value, obtained by the filtering operation, of the equally distributed noise. The value of the threshold SO may be automatically adjusted (as described, for example, in DE 41 37 404 A1) or manually by a user.

To obtain the factor k or (1-k), the median-filtered motion signal M is applied as a noise-eliminated motion signal M' to the circuit 7 (having a descending characteristic) after the threshold circuit 9 has clipped the DC component from the mean value of the noise. Starting from a preselected value K0, the correction value K may decrease to zero with an increasing value of the motion signal.

Figure 2:
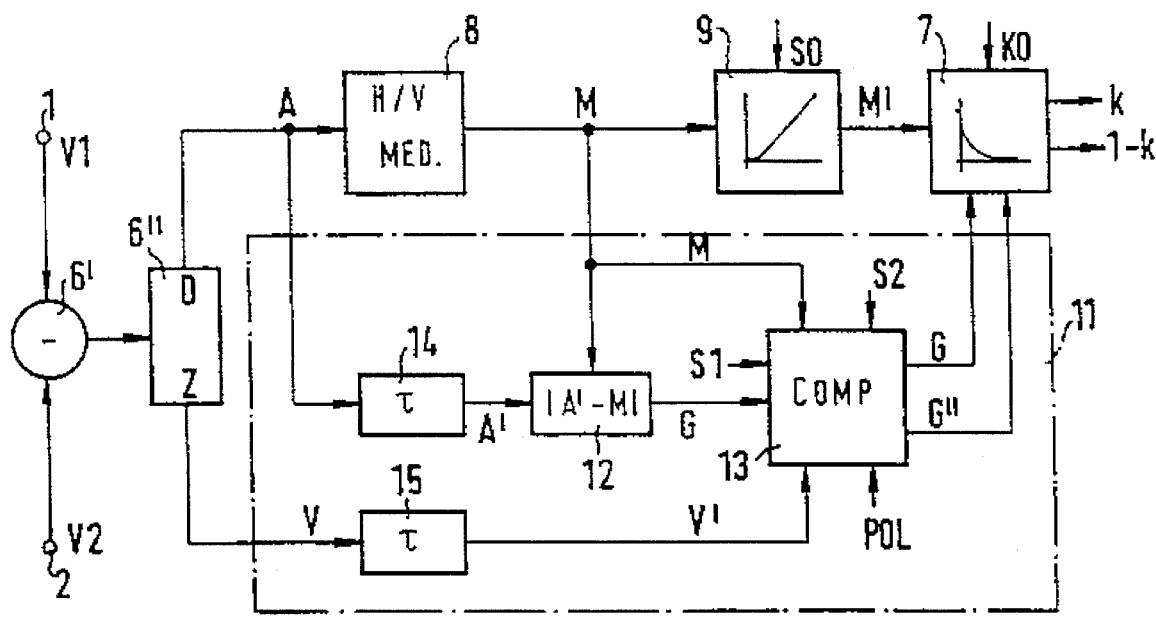
FIG. 2 is a block diagram of a motion detector according to the invention.

In FIG. 2, in order to completely eliminate interference pulses of a high amplitude in the video input signal V1 as well as in the video output signal V2, a device 11 for interference pulse recognition (detection) is provided for modifying the circuit 7. This device 11 essentially comprises a further subtractor stage 12 including a device for forming an absolute value and a comparator stage 13. Moreover, delay members 14 and 15 are provided for delay compensation of the signals applied to the comparator stage 13 with respect to the median-filtered motion signal.

Figure 3:
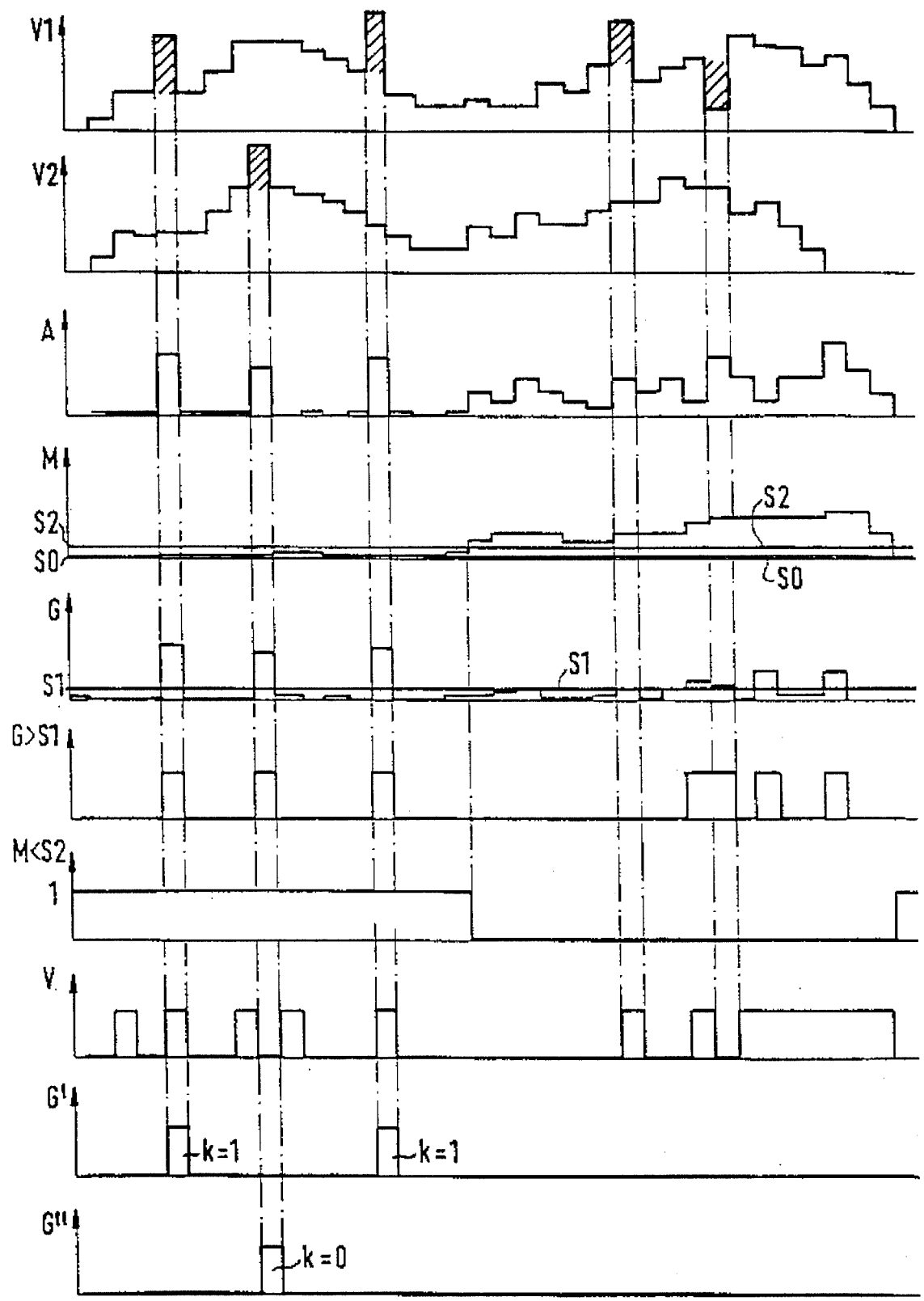
FIG. 3 shows time diagrams of some signals occurring in FIG. 2.

The operation of the arrangement of FIG. 2 will now be further described in relation to the time diagrams shown in FIG. 3, in which the pulsatory interference in the signals V1 and V2 is shaded and the signal V1 relative to the signal V2 in the righthand part is the motion signal.

The undelayed and the delayed video signals are present at the terminals 1 and 2, respectively. The subtractor 6 shown in FIG. 1 is divided into a subtractor stage 6' and a device 6" for forming the absolute value, while the difference (V1-V2) can be derived as a motion signal A from the first output D and a sign signal V can be derived from the second output Z. As already described with reference to FIG. 1, the motion signal A is processed by means of the median filter 8 and the threshold circuit 9 and the factor k is controlled through the value of the motion signal M'.

If, for example, the video signal V1 is beset with impulsive noise, which is shaded for V1 in the time diagram, these pulses also occur in the motion signal A. This signal A is applied to the first input of the subtractor stage 12 after delay time compensation (A') by means of the delay member 14, and the median-filtered motion signal M is present at the second input of the subtractor stage. A pulsatory signal G can then be derived from the output of stage 12. As is clearly evident from the time diagram, a series of smaller pulses is present for the signal G in the case of moving image contents, which pulses do not, however, originate from interference pulses.

To achieve an unambiguous identification of the actual interference pulses, the signals G, M and the sign signal V are applied to the comparator stage 13. In this stage, the signal G is compared with a threshold S1, whereby at G>S1 noise and small motion amplitudes are faded out. If the average noise value is assumed to be at S0 and the peak/peak value is 2×S0, S1 should be dimensioned at 3×S0. The time diagram for the signal G shows that the noise amplitudes are clearly above the threshold value S1. Moreover, the signal M is compared in the stage 13 with the threshold value S2. With the condition M<S2, it is ensured that the stage 13 is not mis-triggered upon motion. In a satisfactory approximation it holds for S2 that: S2=S1=3×S0.

In order to recognize whether the interference pulse originates from the video input signal V1 or from the video output signal V2, the sign signal V must be queried. If the signal V=1, a positive interference pulse is present in the video signal V1.

When all these three conditions are fulfilled in accordance with the equation G'=(V'=1) & (G>S1) & (M<S2), the factor k is brought to full control by means of the signal G', i.e. k=1. The pixels beset with interference pulses are then replaced by the respective pixels of the last image, which equals a pixel-selective freeze of the image.

If an interference pulse occurs in the video output signal V2, the sign will become negative, i.e. the sign signal V=0. A second output signal G" of the stage 13 is then generated in accordance with the equation G"=(V'=0) & (G>S1) & (M<S2) so that the factor k is set to zero. Thus, an interference pulse from the previous image is not stored again.

When negative interference pulses occur in the input signal V1, the sign condition for the signal G' and G" must be inverted by means of the control signal Pol. This is not a drawback in practice, as, dependent on the cause, only "white" noise (scratches or dust on the negative film, interfered satellite channel) or only "black" noise (dropouts in the magnetic recording, scratches or dust on positive film) occurs.

It will be evident that many variations and modifications are possible within the protective scope of the claims. For example, it is possible to redefine the factor k in such a way that the maximum value is reached upon the occurrence of interference in the delayed signal V2 and leads to the supply of the input signal V1, and the minimum value is reached upon the occurrence of interferences in the input signal V1 and leads to the supply of the delayed signal V2. The protective scope of the main claim also comprises this modification of the embodiment described.

I claim:

1. A method of reducing noise in the signal of a motion detector for recursive filtering of video signals, in which the signal is median-filtered, which comprises: suppressing a part of the amplitude range of said signal located below a threshold and which signal is subsequently used for forming a factor (k) for controlling a recursive filter, wherein, in the case of stationary images or images of little motion, setting the factor (k) at a maximum value in dependence upon interference pulses occurring in video input signal (V1), and setting the factor (k) at minimum value in dependence upon interference pulses occurring in a video output signal (V2).

2. A method as claimed in claim 1, which further comprises: deriving both a motion signal (A) and its sign signal (V) when forming an absolute value of the difference between an undelayed and a delayed video signal (v1, v2), forming a further absolute difference value signal (G) from the direct and the median-filtered motion signal (A, M), and in dependence upon said difference value signal (G) and the median-filtered motion signal (M), forming a first and a second control signal (G', G") with which the factor (k) is set to the maximum or the minimum value by comparing said difference value signal with a corresponding threshold signal, and in dependence upon the sign signal (V).

3. A method as claimed in claim 2, wherein each one of the first and second control signals (G' and G") for the maximum and minimum values of the factor (k) is formed only in dependence upon the sign signal (V).

4. A circuit for reducing noise in a signal of a motion detector for recursive filtering of video signals, in which the signal is median-filtered, a part of an amplitude range of said signal located below a threshold being suppressed and which signal is subsequently used for forming a factor (k) for controlling the recursive filter, wherein said circuit comprises:

a subtractor stage having inputs for receiving an undelayed video input signal (V1) and a delayed video output signal (V2);

a device for forming at its output an absolute value signal, said device having an input connected to an output of the subtractor stage;

a two-dimensional median filter having an input connected to the output of the forming device;

a threshold circuit having an input connected to an output of the median filter;

a stage for generating the factor k having an input connected to an output of the threshold circuit;

a further subtractor stage having contained therein a device for forming an absolute value, the further subtractor stage having a first input connected to the device for forming an absolute value signal and a second input connected to the output of the median filter; and a comparator stage having a plurality of inputs and two outputs, wherein a first input is connected to an output of the further subtractor stage, a second input is connected to the output of the median filter and a third input is connected to a sign output (Z) of the device for forming an absolute value signal, two further inputs for receiving a first (S1) and a second (S2) adjustable threshold signal, said two outputs being connected to respective control inputs of the stage for generating the factor k.

5. A circuit as claimed in claim 4, further comprising a first delay member coupled between the device for forming the absolute value signal and the first input of the further subtractor stage, and a second delay member coupled between the sign output (Z) of the device for forming the absolute value signal and the third input of the comparator stage.

6. A circuit as claimed in claim 4, wherein the comparator stage has a further input to which a control signal can be applied for reversing the sign condition of respective output signals at said two outputs of the comparator stage.

7. A motion detector for use with a recursive filter for video signals, wherein the motion detector comprises:

a subtractor stage having first and second inputs for receiving an undelayed video input signal and a delayed video output signal, means coupled to an output of the subtractor stage for deriving an absolute value signal and a sign output signal, a two-dimensional median filter responsive to said absolute value signal to produce at its output a median filtered motion signal, means for generating a control factor (k) for the recursive filter, a threshold circuit coupled between the output of the median filter and an input of said generating means, an absolute value subtractor stage responsive to said absolute value signal and said median filtered motion signal to derive at its output a pulsatory signal, and a comparator stage having a first input coupled to the output of the absolute value subtractor stage, a second input coupled to the output of the median filter, a third input which receives said sign output signal, fourth and fifth inputs which receive first and second adjustable threshold signals, respectively, and first and second outputs coupled to respective control inputs of said generating means so that the control factor (k) is set at a maximum value dependent upon interference pulses occurring in the video input signal and at a minimum value dependent upon interference pulses occurring in the video output signal.

8. The motion detector as claimed in claim 7 wherein said deriving means has first and second outputs which supply said absolute value signal and said sign output signal, respectively, said motion detector further comprising;

a first delay element coupled between said first output and a first input of the absolute value subtractor stage, and a second delay element coupled between said second output and said third input of the comparator stage.

9. The motion detector as claimed in claim 7, wherein the comparator stage has a further input which receives a control signal for reversing the sign condition of respective output signals at the first and second outputs of the comparator stage.

10. A method of reducing noise in the signal of a motion detector which is adapted to derive a factor (k) for control of a video signal recursive filter, said method comprising:

suppressing a part of said signal below a threshold value, wherein for stationary video images or video images with relatively little motion, adjusting the factor (k) to a maximum value dependent upon interference pulses in a video input signal, and adjusting the factor (k) to a minimum value dependent upon interference pulses in a video output signal.

11. The method as claimed in claim 10 which further comprises:

subtracting the video input and output signals to form a difference signal, deriving an absolute value motion signal and a sign signal from said difference signal, median filtering the absolute value motion signal to derive a median filtered motion signal, combining the absolute value motion signal and the median filtered motion signal to derive an absolute difference value signal, and comparing first and second threshold signals with said absolute difference value signal and said median filtered motion signal, respectively, under control by said sign signal to derive further first and second control signals for adjusting the factor (k) to the maximum or minimum value.

* * * * *